(12) United States Patent
Bottomly

(10) Patent No.: US 10,931,910 B2
(45) Date of Patent: Feb. 23, 2021

(54) VEHICLE-CARRIED INFORMATION DISPLAY SYSTEMS AND METHODS

(71) Applicant: Nathaniel W. Bottomly, Salt Lake City, UT (US)

(72) Inventor: Nathaniel W. Bottomly, Salt Lake City, UT (US)

(73) Assignee: Nathaniel W. Bottomly, Salt Lake City, UT (US)

( * ) Notice: Subject to any disclaimer, the term of this patent is extended or adjusted under 35 U.S.C. 154(b) by 14 days.

(21) Appl. No.: 16/183,667

(22) Filed: Nov. 7, 2018

(65) Prior Publication Data

US 2019/0141280 A1 May 9, 2019

Related U.S. Application Data

(60) Provisional application No. 62/582,890, filed on Nov. 7, 2017.

(51) Int. Cl.
*B60Q 1/30* (2006.01)
*H04N 5/655* (2006.01)
*B60R 11/02* (2006.01)
*G01S 19/13* (2010.01)
*G09F 21/04* (2006.01)
(Continued)

(52) U.S. Cl.
CPC ......... *H04N 5/655* (2013.01); *B60R 11/0235* (2013.01); *G01S 19/13* (2013.01); *G09F 21/048* (2013.01); *G09F 27/00* (2013.01); *B60Q 1/503* (2013.01); *B60R 2011/004* (2013.01); *B60R 2011/0085* (2013.01)

(58) Field of Classification Search
CPC ........... B60R 11/0235; B60R 2011/004; B60R 2011/0085; B60Q 1/503; G09F 27/00; G09F 21/048; G01S 19/13; H04N 5/655
See application file for complete search history.

(56) References Cited

U.S. PATENT DOCUMENTS

| | | | |
|---|---|---|---|
| 7,347,017 B2 * | 3/2008 | Shaffer, Jr. .............. | G09F 21/04 296/21 |
| 7,490,426 B2 * | 2/2009 | Scarberry ........... | G09F 15/0025 116/63 P |

(Continued)

*Primary Examiner* — Philip P. Dang
(74) *Attorney, Agent, or Firm* — Thorpe North & Western

(57) ABSTRACT

An information display system for use on a vehicle comprises a portable display support platform, and at least one vehicle interface support member coupled to the portable display platform and comprising a universal vehicle coupling device operable to couple the portable display support platform to a vehicle support structure. An electronic information display device, supported by the portable display platform, is moveable between a stowed position and a deployed position, and is operable to display information (e.g., advertisements) when in the deployed position. A computer implemented method includes: receiving position data, at a server via a network, for a position of a vehicle supporting an electronic information display device; identifying, using the position data, a display activation zone that includes the position of the vehicle; identifying display information associated with the user; and sending instructions to a device of the vehicle, via the network, to display the display information on the electronic information display device.

15 Claims, 9 Drawing Sheets

(51) Int. Cl.
*G09F 27/00* (2006.01)
*B60R 11/00* (2006.01)
*B60Q 1/50* (2006.01)

(56) References Cited

U.S. PATENT DOCUMENTS

| | | | |
|---|---|---|---|
| 7,852,622 B2* | 12/2010 | Ferren | B60K 35/00 361/679.05 |
| 7,882,653 B2* | 2/2011 | Barlow | G06Q 30/0275 40/606.15 |
| 9,568,952 B2* | 2/2017 | Matzke | G06F 1/1675 |
| 9,743,769 B2* | 8/2017 | Prasad | A47B 97/001 |
| 9,944,235 B2* | 4/2018 | Fischer | B64D 11/00153 |
| 10,060,175 B1* | 8/2018 | Lickfelt | H04L 12/2829 |
| 10,139,621 B2* | 11/2018 | Quiroz de la mora | G02B 27/0101 |
| 10,196,147 B2* | 2/2019 | Reyes | B64D 11/0638 |
| 10,332,394 B2* | 6/2019 | Gomez Gutierrez | G08G 1/087 |
| 10,384,578 B2* | 8/2019 | Muldowney | B60N 2/879 |
| 10,565,871 B2* | 2/2020 | Feng | G08G 1/096791 |
| 2007/0275783 A1* | 11/2007 | Hussaini | A63F 13/02 463/47 |
| 2018/0181359 A1* | 6/2018 | Monroe | G06F 3/0488 |
| 2019/0092170 A1* | 3/2019 | Gassman | B60R 11/0235 |

\* cited by examiner

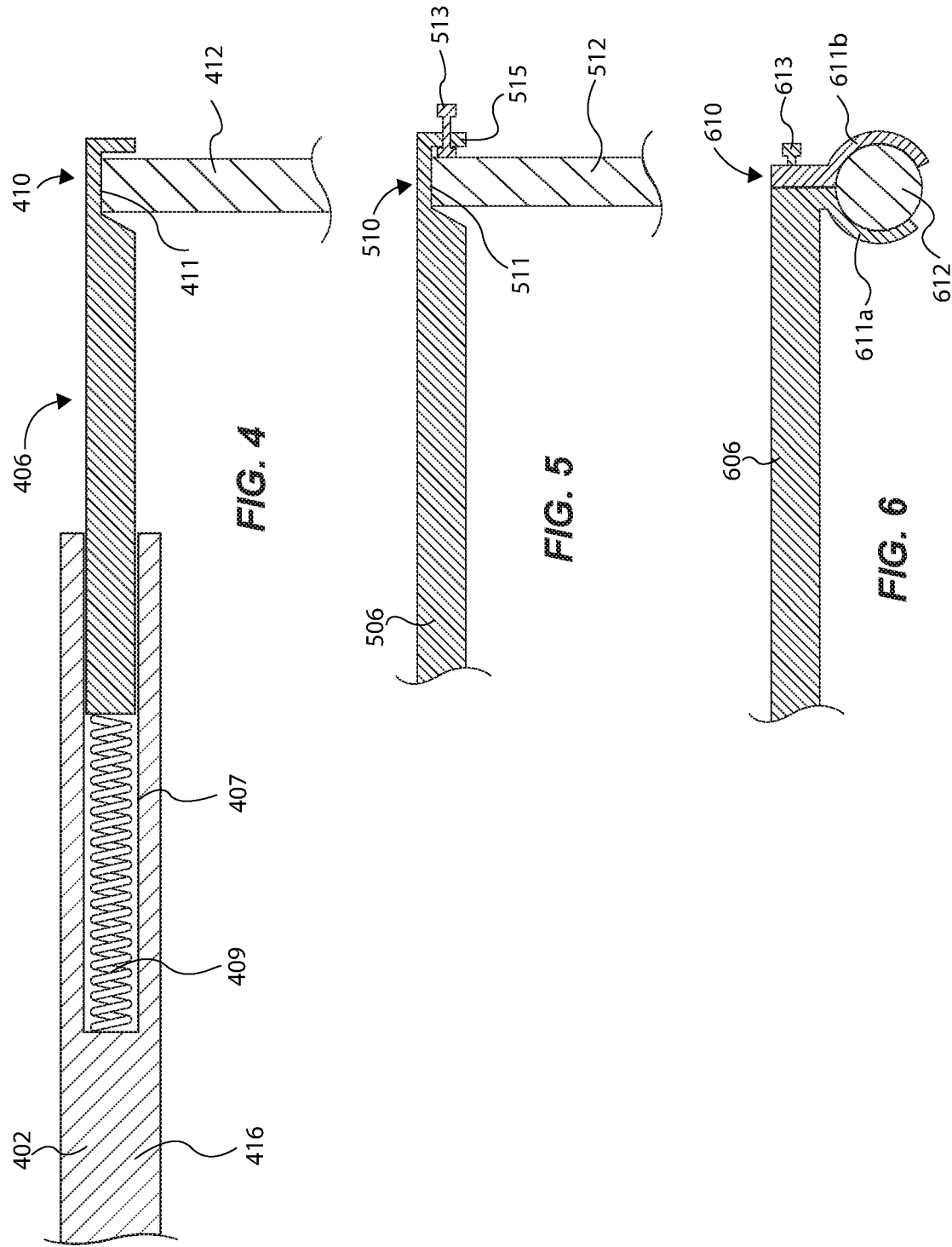

VEHICLE-CARRIED INFORMATION DISPLAY SYSTEMS AND METHODS

RELATED APPLICATION

This application claims the benefit of U.S. Provisional Patent Application No. 62/582,890, filed Nov. 7, 2017, the contents of which are incorporated herein by reference.

BACKGROUND

Advertising information is often displayed on vehicles, such as printed materials attached to the sides of vehicles. Such advertising materials are permanently mounted or attached to the vehicle, which is limiting in terms of changing the advertisement and/or the orientation of the display unit. In many instances, mounting devices that mount an advertising display unit to a vehicle are often unique to the particular vehicle being mounted to, which makes it difficult to mount such advertising display unit to a different vehicle without substantial modification or requiring new mounting devices. In other instances, screws or other fasteners are used to permanently mount an advertising display unit to a vehicle, which is destructive to the vehicle and makes it difficult or impossible to remove the advertising display unit without damaging the vehicle. Moreover, a technician is usually required to install or replace such advertising display unit, which requires tools, scheduling, costs, etc.

In certain location-based situations, such as law enforcement incident sites, emergency response sites, and natural disaster sites, it is often important to display critical information to emergency personnel, victims, and bystanders. It is further important that such critical information is up-to-date and accurate, which is often difficult to achieve on a mass scale at a particular site.

SUMMARY

In accordance with a more detailed aspect of the present technology, an information display apparatus or system for use on a vehicle comprises a portable display support platform, and at least one vehicle interface support member coupled to the portable display platform. The at least one vehicle interface support member comprises a universal vehicle coupling device operable to couple the portable display support platform to a vehicle support structure. An electronic information display device can be supported by the portable display support platform, and is moveable between a stowed position and a deployed position. The electronic information display device can be operable to display information when in the deployed position.

In one example, the present technology sets forth a display activation system comprising a vehicle supporting an electronic information display device; a device with at least one processor and at least one memory device including instructions that, when executed by the at least one processor, cause the device to: determine a position of the vehicle based on position data received from a positioning system; request display information that corresponds to the position of the vehicle (wherein the position of the vehicle is within a display activation zone defined by a physical location of a user associated with the display information); provide the display information to the electronic information display device; and cause the portable display support platform to display information associated with the user while the vehicle is within the display activation zone.

A computer implemented method can comprise: receiving position data, at a server via a network, for a position of a vehicle supporting an electronic information display device; identifying, using the position data, a display activation zone that includes the position of the vehicle, wherein the display activation zone is defined by a physical location of a user; identifying display information associated with the user; and sending instructions to a device of the vehicle, via the network, to display the display information on the electronic information display device.

BRIEF DESCRIPTION OF THE DRAWINGS

FIG. 4 is a cross sectional view of a vehicle interface support member, of an information display system, having a universal coupling device coupled to a vehicle support structure, in accordance with an embodiment of the present technology.

FIG. 5 is a cross sectional view of a vehicle interface support member, of an information display system, having a universal coupling device coupled to a vehicle support structure, in accordance with an embodiment of the present technology.

FIG. 6 is a cross sectional view of a vehicle interface support member, of an information display system, having a universal coupling device coupled to a vehicle support structure, in accordance with an embodiment of the present technology.

DETAILED DESCRIPTION

Figure 1:
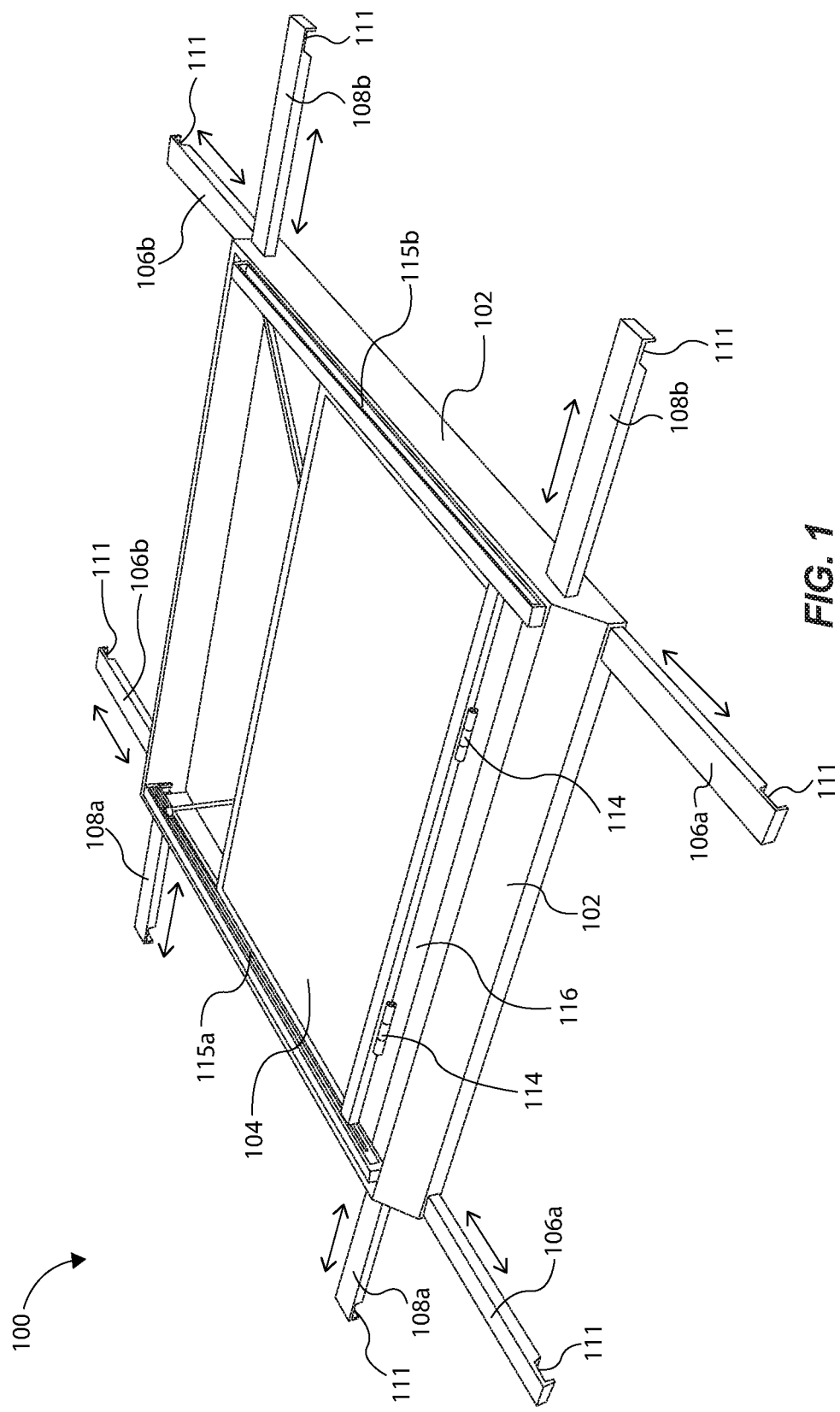
FIG. 1 is an isometric view of an information display system, unattached to a vehicle, and having an electronic information display device in a stowed position, in accordance with an embodiment of the present technology.

Before the present disclosure is described herein, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

The following terminology will be used in accordance with the definitions set forth below.

As used herein, "adjacent" refers to near or close sufficient to achieve a desired effect. Although direct physical contact is most common and preferred in the structures or volumes of the present invention, adjacent can broadly allow for spaced apart features.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Dimensions, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

The Disclosure

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the system, or the related devices or methods, individual or separate descriptions are considered applicable to one other, whether or not explicitly discussed in the context of a particular example or embodiment. For example, in discussing a vehicle tray per se, device, system, and/or method embodiments are also included in such discussions, and vice versa.

Furthermore, various modifications and combinations can be derived from the present disclosure and illustrations, and as such, the following figures should not be considered limiting.

Figure 2:
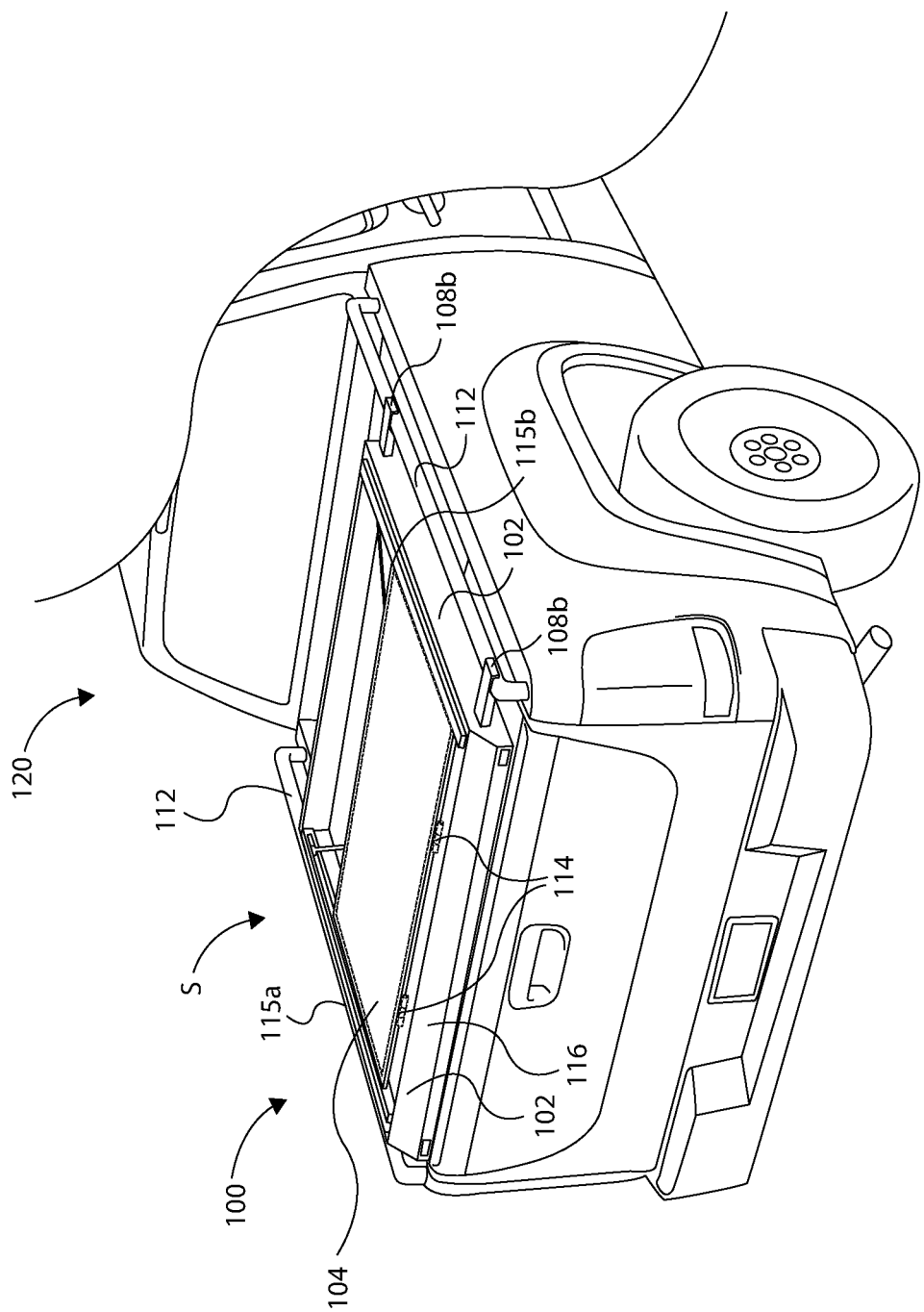
FIG. 2 is an isometric view of the information display system of FIG. 1, removably coupled to a vehicle, in accordance with an embodiment of the present technology.
Figure 3:
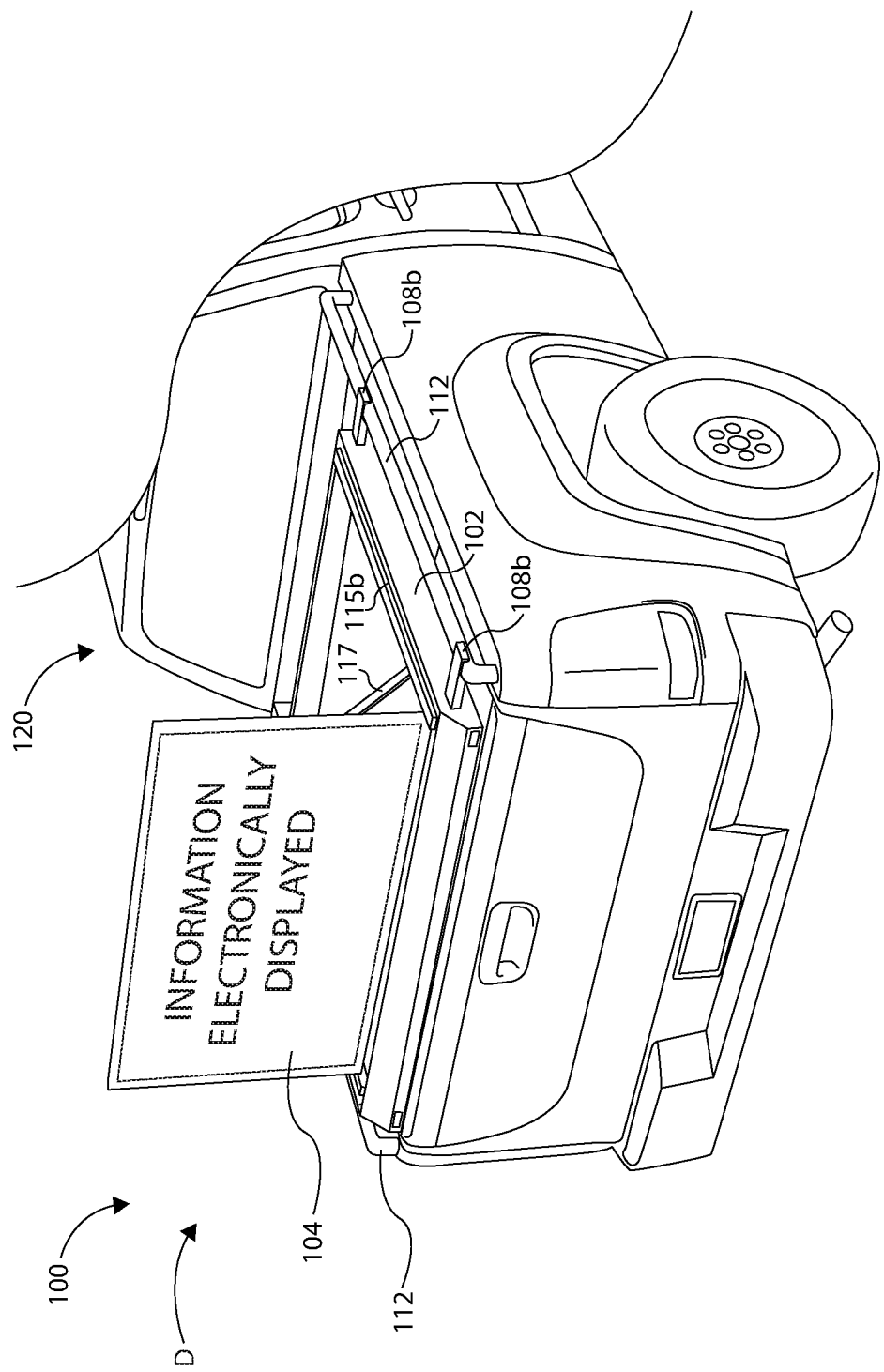
FIG. 3 is an isometric view of the information display system of FIG. 2, removably coupled to the vehicle, and having the electronic information display device moved to in a deployed position, in accordance with an embodiment of the present technology.

As illustrated in FIGS. 1-3, an information display apparatus or system, indicated generally as 100, in an example implementation in accordance with the technology, is provided for use on or supported by a vehicle 120. The information display system 100 can comprise an electronic information display device 104 (e.g., electronic display screen) movable between a stowed position S (FIG. 2) and a deployed position D (FIG. 3) when coupled to or supported by the vehicle 120 for displaying information electronically.

The information display system 100 can comprise a portable display support platform 102 removably couplable to the vehicle, and a plurality of pairs of vehicle interface support members 106a, 106b, 108a, and 108b coupled to the portable display platform. Each of the vehicle interface support members 106a, 106b, 108a, and 108b can comprise a universal vehicle coupling device 110 operable to and configured to removably couple the portable display support platform 102 to a vehicle support structure 112 (FIG. 2), which, in this example, is a side-rail bar or member mounted to the bed of a truck. The vehicle interface support members 106a, 106b, 108a, and 108b can comprise elongate rods, shafts, or members that are translatable into and relative to the portable display support platform 102 (see e.g., FIG. 4). In this manner, each of the vehicle interface support members 106a, 106b, 108a, and 108b can accommodated different sizes of vehicle support structures, such as different sizes and shapes of truck beds, because the vehicle interface support members 106a, 106b, 108a, and 108b can be movable (e.g., translatable) to different lengths relative to each other while coupling the universal vehicle coupling device 110 to various sizes and shapes of support structures of a particular vehicle.

The universal vehicle coupling device 110 may comprise a recessed portion 111 formed about an underneath side of the respective vehicle interface support members 106a, 106b, 108a, and 108b, which can be shaped and sized to cover or interface with the vehicle support structure 112 (e.g., side rail, bed frame, etc.) of the vehicle 120. This configuration provides lateral support to the portable display support platform 102 so that it does not slide axially along the xy axes (i.e., horizontal planes relative to earth). In one example, a weight of the information display system 100 can prevent it from bouncing up and off of the vehicle. Alternatively, straps can be used to hold down the information display system 100. Further alternatively, a lateral biasing device, such as a compliant device (FIG. 4) can be used to apply a lateral force to hold the information display system 100 in place. However, a particular universal vehicle coupling device may take other shapes and forms, such as discussed below regarding FIGS. 5 and 6, for coupling the vehicle-carried information display system 100 to different shapes and sizes of vehicle support structures, such as vehicle panels, beds, rails, roof racks, structural openings, etc. In another example, the vehicle interface support members can be foldable, such as underneath the platform, so that it may be compact for storage and transportation.

The electronic information display device 104 can be a digital display, such as a television monitor, computer display, projector screen, or other display capable of displaying electronically-derived or based information, including but not limited to LED (light emitting diode), LCD (liquid crystal display), plasma, quantum dot or other display technologies. As illustrated in FIGS. 2 and 3, the electronic information display device 104 can be movable between the stowed position S (FIG. 2) and the deployed position D (FIG. 3). The electronic information display device 104 can be movably coupled to the portable display platform 102 by a number of means, such as by one or more pivot devices 114 (e.g., hinges) attached along a bottom edge of the electronic information display device 104 and attached to a structural frame 116 of the portable display platform 102. Alternatively, the portable display platform 102 can comprise side rails 115*a* and 115*b* supported by the structural frame 116, and that have slots that slidably and pivotally receive side pins (not shown) that are mounted to the bottom sides of the electronic information display device 104. Thus, the electronic information display device 104 can pivot about the side pins when being moved between the stowed and deployed positions. Other suitable pivot devices could be used that facilitate pivoting or rotating of the electronic information display device 104 relative to the portable display platform 102. Being capable of being moved to the stowed position (e.g., horizontal relative to earth) reduces wind drag forces acting on the vehicle via the electronic information display device when the vehicle is in motion, and also prevents damage to the electronic information display device (e.g., from wind, or low hanging structures). Being capable of moving the stowed position can maximize fuel or energy efficiency of the vehicle, and allow for a much larger display to be mounted to the vehicle because it can be stowed horizontally about the vehicle during transport, such as on the freeway. Having a larger screen (e.g., nearly the width of the vehicle) increases the size of information displayed, which increases or maximizes public awareness of the information displayed thereon.

In one example, a pivotable support member 117 (FIG. 3) can be pivotally attached to the electronic information display device 104 and to the portable display platform 102 for providing structural support to help support the electronic information display device 104 in the deployed position D. In one example, an electric motor (not shown) can be supported by the portable display platform 102 for powering movement of the electronic information display device 104 between the stowed and deployed positions. The motor can be coupled to a controller and a receiver, whereby the receiver receives instructions from a device (e.g., mobile electronics device of a user) to move the electronic information display device 104 via the controller, which activates the motor. Alternatively, movement of the electronic information display device 104 can be achieved by operating a power switch for providing power to the motor, with optional directionality for movement to a deployed position and oppositely for movement to a stowed position. Alternatively, movement of the electronic information display device 104 can be achieved manually by a user grasping the electronic information display device 104 and moving into position (either stowed or deployed), through manual operation of a crank, etc. In one example, a locking mechanism can be provided, such as a pin/hole lock device operable with the pivotably support member 117, for instance, to lock the electronic information display device 104 in place when deployed and stowed.

When in the deployed position D, the electronic information display device 104 is operable to display information, such as electronically displayed advertising/marketing materials, graphics, logos, animations, emergency information, and any other information desired. As further detailed below, such display of information can occur manually, which can be achieved by a user operating an application on a mobile device (or other computing system) that is wirelessly connected to the electronic information display device 104 (e.g., via Wi-Fi, Bluetooth®, etc.). In this manner, the user can operate the smartphone application to select the type of information to display, the duration, the date/time to display the information, the location, etc. Alternatively, the display of information can occur automatically in examples where the electronic information display device 104 comprises data stored in a memory device coupled to a CPU (central processing unit) that causes display of such programmed or stored information on the display screen. Other examples of automatic display of information are further detailed below regarding FIGS. 7-11. Note that the electronic information display device can be moved to any suitable angle relative to the portable display support platform, such as anywhere from just a few degrees up to 120 degrees, for instance, depending on the type of vehicle.

When in the stowed position S, the electronic information display device 104 may have at least one side thereof for displaying information, which one side may be face-up (i.e., the one side faces away from the vehicle), or may be face-down (i.e., the one side faces toward the vehicle). For example, a face-up configuration may enable positioning of the information for display closer to a particular edge of the vehicle, while a face-down configuration may protect the electronic display screen during stowage, such as for freeway travel, storage, etc. This can be achieved by utilizing the aforementioned side pins and rails 115*a* and 115*b* systems, where the electronic information display device 104 can be slid along the rails and inverted, so that the display screen is facing downwardly toward the bed of the truck, for instance.

In one example, a solar panel (not shown) can be supported by the portable display information platform, which may be exposed when the electronic information display device is deployed. That is, the solar panel can be situated laterally along a surface of the portable display information platform, and underneath the electronic information display device when stowed. The solar panel can be used for powering the display, motor, and other aspects of the system, and even for powering the vehicle itself. Alternatively, a solar panel can be coupled adjacent or around the display portion, so that power may be generated regardless of the position of the electronic information display device. A battery may be provided which can be charged by the solar panel or by other sources, such as connection to a power outlet. The motor, display or other features may be powered using the battery, power outlet, etc. The battery may be a vehicle battery and the vehicle interface support member may have a cable for electric coupling to the vehicle electrical system. In another example, the battery may be separate from the vehicle battery and may be attached to and supported by the vehicle interface support member. When the display is connected to the vehicle electrical system, the display may be powered by electrical current generated by an alternator of the vehicle.

FIG. 4 shows an example of a vehicle interface support member 406 having a universal coupling device 410 coupled to a vehicle support structure 412. Similar to the example of FIG. 1, the universal coupling device 410 can comprise a recess 411 sized to cover or interface with the vehicle support structure 412. The recess 411 can have linear surfaces, curved surfaces, or other shapes. The vehicle interface support member 406 can comprise an elongate rod or member that is slidably received through a bore 407 of a structural support 416 of a portable display support platform 402 (e.g., 102). A compliant or elastic element, such as a coil spring 409 can be seated in the bore 407 and interfaced to one end of the vehicle interface support member 406. The coil spring 409 can be configured to outwardly bias the vehicle interface support member 406 away from the portable display support platform 402, thereby exerting a lateral biasing force with the universal coupling device 410 against an inner side wall of the vehicle support structure 412. In this manner, such biasing force can "hold" the portable display support platform 402 in place, so that it does not move or bounce upwardly and off of the vehicle during driving. Alternatively, the coil spring 409 can be in an extended position, such that it is configured to pull inwardly the vehicle interface support member 406, thereby exerting a lateral biasing force with the universal coupling device 410 against an outer side wall of the vehicle support structure 412. Note that the vehicle interface support members contemplated herein can be held in place to the portable display support platform 402 by other means, such as: rotatable compression pins; insertable pins into holes of the vehicle interface support members; clamps that use friction force; and other suitable devices.

FIG. 5 shows another example of a vehicle interface support member 506 having a universal coupling device 510 coupled to a vehicle support structure 512. Similar to the example of FIG. 1, the universal coupling device 510 can comprise a recess 511 sized to cover or interface with the vehicle support structure 512. The vehicle interface support member 506 can comprise an elongate rod or member that is slidably received through a bore (e.g., 407) of a structural support (e.g., 416) of a portable display support platform (e.g., 102). A threaded or movable clamp device 513 can extend through an aperture in an outer flange 515 of the vehicle interface support member 506, and can be operated by hand to be tightened to clamp the vehicle interface support member 506 to the vehicle support structure 512.

FIG. 6 shows another example of a vehicle interface support member 606 having a universal coupling device 610 coupled to a vehicle support structure 612 (e.g., a round bar). The universal coupling device 610 can comprise a first half clamp body 611a and a second half clamp body 611b sized to clamp or wrap around a round vehicle support structure 612. The vehicle interface support member 606 can comprise an elongate rod or member that is slidably received through a bore (e.g., 407) of a structural support (e.g., 416) of a portable display support platform (e.g., 102). A threaded or movable clamp device 613 can extend through an aperture in the second half clamp body 611b, which can be operated by hand to be tightened to clamp the vehicle interface support member 606 to the vehicle support structure 612. Note that other suitable clamp devices are contemplated herein, and that are capable of coupling to a support structure of a vehicle.

In one example, only one vehicle interface support member can be coupled to a portable display platform, such as a horizontally oriented plate or rod that extends from opposing sides of the portable display support platform, and that can be adjustable in length to accommodate for different size vehicles and their differing mounting structures. Alternatively, a single vehicle interface support member can be coupled to the vehicle and to the back side of the display platform, and can provide a pivoting mechanism for the display platform to rotate. The universal vehicle coupling devices contemplated herein can take other forms, such as straps, hook-and-loop fasteners, hand-crank or clamp-based devices, etc., and that do not damage a surface or structure of the vehicle.

In some examples, a particular information display system can comprise a swivel mechanism supported by the portable display support platform and coupled to the electronic information display device, in a manner so that the electronic information display can rotate (e.g., up to 360 degrees) relative to the portable display support platform and the vehicle.

In some examples a pair of electronic information display device can be mounted to a portable display support platform, and both electronic information display devices can be moved between a stowed position and a deployed position (e.g., manually or powered/automatically). In one aspect, one of the electronic information display devices can be pivotally mounted to the other electronic information display device, in a manner such that the display panels are facing each other in a flat configuration when in the stowed configuration. This can prevent damage due to the sun, rain, snow, etc. because the display panels would be hidden when in the stowed position.

In some examples, an information display system can be mounted to a roof/luggage rack of a vehicle, such as to any number of horizontally orientated side rails, or a full roof-rack having four rails arranged in a rectangle, for instance. This can be advantageous for law enforcement purposes that require the back side of vehicles to be clear from obstruction so that personnel can quickly access the trunk area without having to move an electronic display. Thus, placing the electronic information display device on the top of a vehicle situates it above the vehicle and away from the trunk area for easy access to the trunk. In some examples, the electronic information display device can be oriented facing any outward position relative to the vehicle because it can be mounted in at least four possible orientations on the roof rack (i.e., 0, 90, 180, 270 degrees) due to the movable and adjustable vehicle interface support members that accommodate different size vehicle structures or supports, as noted above.

In some examples, an information display system can be mounted to a recreational vehicle, such as the top or back of a golf cart). Notably, the electronic information display device can be actuated to the deployed position upon an event or at predetermined time and/or location, such as when the golf cart is on the $8^{th}$ hole. Specifically, the electronic information display device can be communicatively linked to an onboard GPS system (which most golf carts are now equipped), so that the electronic information display device "knows" that it is on the $8^{th}$ hole and then displays information pertaining to food/drink sold by the golf course after the $9^{th}$ hole. Alternatively, a signal can be sent from a transmitter at a computer system in the golf clubhouse to cause deployment the electronic information display device and to cause display certain information at an appropriate time or location of the golf cart (e.g., $8^{th}$ hole, $17^{th}$ hole), such as to advertise for food/drink offered by the clubhouse. In another example, the driver or passenger of the golf cart can operate an application on a smartphone to control the type of information displayed on the electronic information display device, such as advertisement for their company. This can be advantageous during tournaments, such as charity events that draw large crowds.

In one example, an electronic information display device can be mounted to a trailer hitch coupler of a vehicle. For instance, one end of a support rod can be removably coupled to the trailer hitch coupler, and extend vertically upwardly along the back of the vehicle. The electronic information display device can mounted to the other end of the support rod, so that the display screen faces outwardly from behind the vehicle. In one example, the electronic information display device can be pivotally mounted to the end of the support rod, so that a user (or motor) can cause rotation of the electronic information display device in directions as desired. In some examples discussed herein, an electronic information display device can be electrically coupled to the electrical tow harness of the vehicle for powering the electronic information display device. Use of the universal vehicle coupling device described herein to mount the electronic information display device to a part of a vehicle other than a trailer hitch coupler may provide the added benefit of increased accessibility to the vehicle, where mounting to a trailer hitch coupler may block or restrict access to a portion of the vehicle.

In one example, an information display device may be hung on a wall, vehicle side, or other vertical surface or in such a vertical orientation and may be used to display information with the display in the stowed position.

The example information display systems discussed herein could be useful at universities, by parks and recreation departments, radio broadcasting events, concerts, sporting events, etc., or even at crime scenes (by law enforcement) or at natural disaster response teams (e.g., by FEMA (Federal Emergency Management Agency)), so that important or critical information can be displayed to affected individuals, which can provide real-time information that is current and accurate and reliable.

Figure 7:
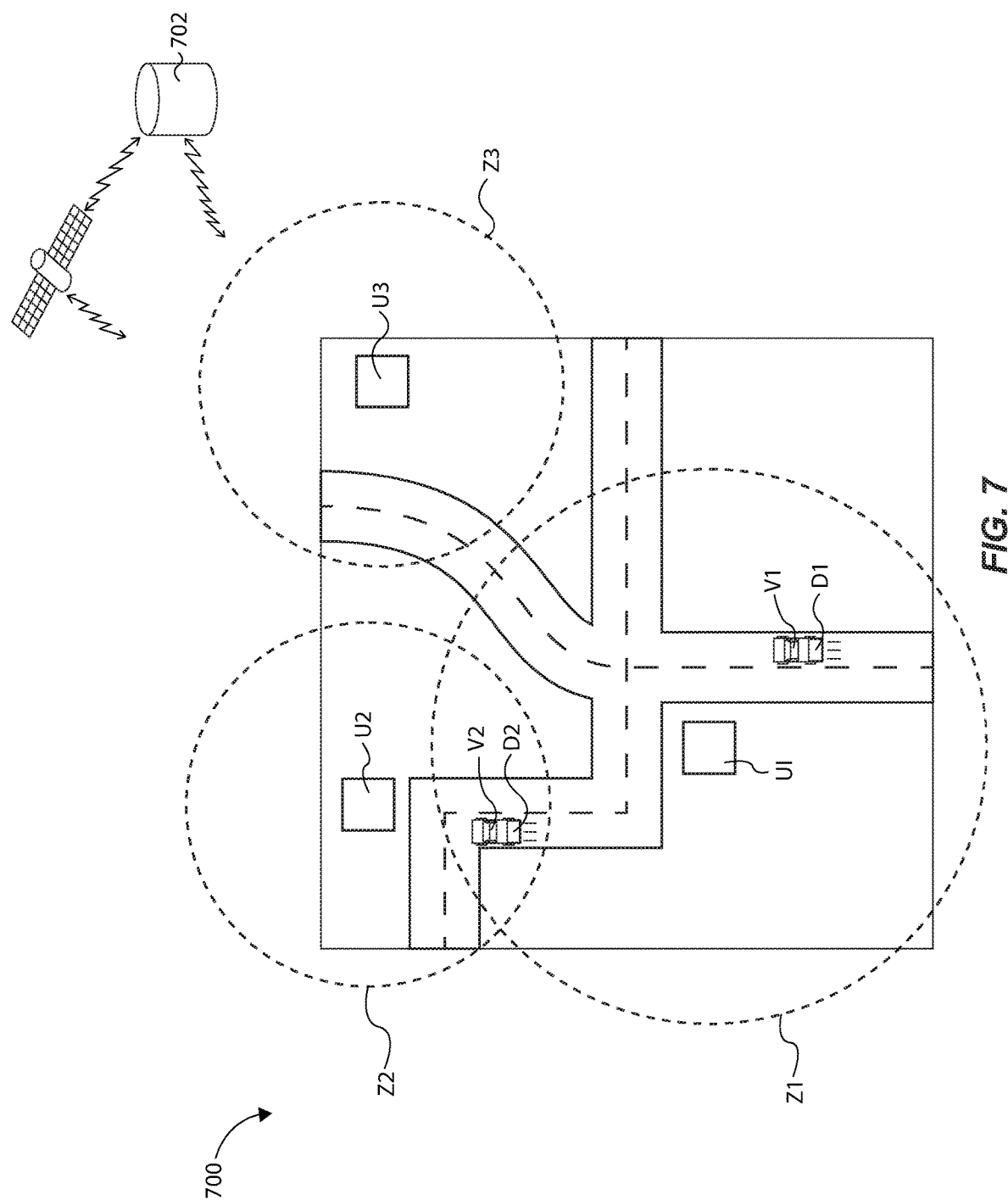
FIG. 7 illustrates a vehicle information display system and method, in accordance with an embodiment of the present technology.

As noted above, the particular information displayed on one or more electronic information display devices can be automatically/autonomously controlled in a number of scenarios. FIG. 7 illustrates one such system and method, labeling generally as system 700, which can include one or more vehicles V1 and V2 supporting respective electronic information display device D1 and D2 (e.g., 104), which can be part of a vehicle information display system (e.g., 100), or it can be a stand-along display mounted to the vehicle in a continuously deployed or static position (i.e., a display that is not necessarily moveable between stowed and deployed positions).

The system 700 can comprise a device, such as a mobile electronics device M1 and M2, associated with a respective user of the vehicles D1 and D2. For instance, the user can be a driver (or passenger) carrying a mobile electronics device M1, such as a tablet, smartphone, laptop, wearable device, etc. Each mobile electronics device M1 and M2 can comprise a positioning system, such as a GPS system for determining a position of the mobile electronics device, and consequently the position of the user and the vehicle (see FIG. 8 discussion). Each mobile electronics device M1 and M2 can comprise a wireless communication module (e.g., Bluetooth, Wi-Fi) that is communicatively coupled to a wireless communications device (e.g., Bluetooth, Wi-Fi) of the electronic information display device, whereby the mobile electronics device is operable to control movement of the respective electronic information display device D1 and/or D2, and/or to control a type of display information to display on the respective electronic information display device D1 and/or D2. More specifically, the mobile electronics device M1, for instance, having at least one processor and at least one memory device, includes instructions that, when executed by the at least one processor, cause the device to determine a position of the vehicle V1 based on position data received from a positioning system (e.g., GPS system on the device, along with GPS satellites that continuously determine the position of the mobile electronics device M1). The at least one processor can then request display information that corresponds to the position of the vehicle V1. The request can be transmitted, via cellular or Wi-Fi networks, to a central server(s) 702 (see e.g., 802 of FIG. 8) that includes one or more processors that determine whether the position of the vehicle V1 is within a display activation zone Z1 defined by a physical location of a user U1 associated with the display information. For instance, the user U1 can be a merchant of a store having or operating a store at a physical location, and/or where the user U1 has chosen or selected to participate in a program designed to cause display of their information (e.g., advertising information) on any electronics information display device that happens to drive within the display activation zone Z1 associated with the user's physical location. For instance, the user/merchant can select, via a computer program and interface, to cause display of information when a supporting vehicle is within a 15 mile radius of the user's store location, which thereby defines the display activation zone Z1. Thus, when the vehicle V1 is driven into or is within the display activation zone Z1, the central server(s) 702 can determine that such event has occurred (see discussion below). Based on this information, the central server(s) 702 can provide (transmit) the display information (associated with the user U1) to the mobile electronics device M1, and then the mobile electronics device M1 can cause or transmit or provide the display information to the electronic information display device D1 supported by the vehicle V1. This causes the portable display support platform to display information, associated with the user U1, on the electronic information display device D1 while the vehicle V1 is within the display activation zone Z1. Once the vehicle V1 has left the display activation zone Z1, the instructions may cause the display information to be removed from display on the electronic information display device D1, because the central servers(s) 702 will have determined that the vehicle V1 is no longer within the display activation zone Z1 based on the determined position of the vehicle V1, as further detailed below.

If the central servers(s) 702 has determined that the vehicle V1 has moved to another display activation zone (e.g., based on a dynamic position of the vehicle), such as the display activation zone Z3, the instructions can cause the mobile electronics device M1 to cause the portable display support platform to modify the display information (e.g., display information associated with user U3) based on such dynamic position of the vehicle V1.

Note that the central servers(s) 702 can determine or receive a navigation path of the vehicle V1, such as by receiving or determining a known navigation path from the device of the user, which is prevalent with rideshare services that have a pre-determined or known navigation path. Based on the known or determined navigation path, the central servers(s) 702 can determine whether the vehicle V1 will travel within one or more display activation zones (e.g., Z1 and Z2), and then the server(s) 702 can execute the aforementioned processes to cause display of display information based on the display activation zone(s) that the vehicle V1 will travel through, and as the vehicle V1 travels through such zone(s).

As illustrated in the system 700, the central server(s) 702 can achieve the above-noted functionality for a plurality of vehicles (dozens or hundreds), such as illustrated graphically as the plurality of vehicles V1 and V2. For instance, based on the determined position of vehicle V2, the processor(s) of the central server(s) 702 can determine that the vehicle V2 is positioned within both display activations zones Z1 and Z2, and therefore, cause display of information associated with both users U1 and U2. At the same time, the central server(s) 702 can do the same processing for vehicle V1, as described above. For instance, display information associated with user U1 can be caused to be displayed for 8 seconds, and then display information associated with user U2 can be cause to be displayed sequentially for another 8 seconds. Thus, any number of users in the area can have their information displaying on any number of vehicles that are within their particular display activation zone, and in 8 second intervals, for instance.

Moreover, information can be displayed regardless of the whether the vehicle is within a particular display activation zone, such as information associated with a competitor of users U1 and U2. For instance, if user U3 is a major competitor in the area, user U3 can choose to display their information on particular electronic display information devices on vehicles that may be within the city limits, but not necessarily within a smaller (e.g., 5 mile radius) display activation zone. This can help to draw customers away from users U1 and U2, and over to user U3 for merchant services.

The principles and operations discussed above can also be applied to other scenarios, such as at crime scenes or incident response sites. For instance, if one or more emergency response vehicles have an electronic information display device mounted thereon, a central server(s) can determine if the vehicle(s) are within a display activation zone of a particular location, such as within 10 miles of a first response base station. Based on the determination of the location of the vehicle(s), the central server(s) can cause display of particular information (e.g., constantly updated information) on all of the electronic display devices within the zone. In this manner, first responders and the public/victims can gather up-to-date and accurate information from the display devices supported by vehicles in the area, as opposed to receiving the information from individuals, which is historically inaccurate or outdated. In another example, based on a determination of a time of day, the content displayed on the information display device may be set. For example, advertisements for lunch specials at restaurants may be displayed during a predetermined time period, such as from 11 a.m. to 2 P.M. The advertisements may be matched with a geographical location of the information display device such that the advertisements may be for lunch specials at restaurants within a defined radius of the information display device. Content to display may thus be determined based on a combination of location of the information display device as well as the time. Type of content to display may also vary based on these factors, such as to switch between advertisements, public service announcements, venue information, and so forth.

In some examples, a particular vehicle, such as a self-driving autonomous vehicle, can have one or more cameras facing outward that are constantly scanning the surrounding environment. Image data gathered by such cameras can be processed by a machine learning module configured to compare captured images, such as of storefronts, restaurant signs, or the like and determine that one or more of such images are associated with a physical location of a user (e.g., a merchant of food services). Then, a CPU, executing instructions of a non-transitory machine readable storage medium, can be configured to cause display of information on an electronic information display device (supported by the vehicle) associated with the determined user(s) from the machine learning module. Moreover, the machine learning module can store historical data based on prior determinations in a particular geographical area, and then cause automatic display of the same display information when the vehicle returns to the same geographical area.

The methods and systems described herein can be advantageous for transient users, such as drivers or passengers of a rental car, passengers of ride-share services (e.g., Uber®/Lyft®). This can also be advantageous for marketing companies that can track/monitor the position of the vehicle, and then display certain advertisement based on a targeted neighborhood, business, demographic(s), etc., as based on the position and/or navigation path of the vehicle. Moreover, local business owners that subscribe to local check-in services (e.g., Four Square®, Facebook®) can have their advertisements display on the electronic information display device when the vehicle drives near, or is within a certain radius of the particular establishment.

Figure 8:
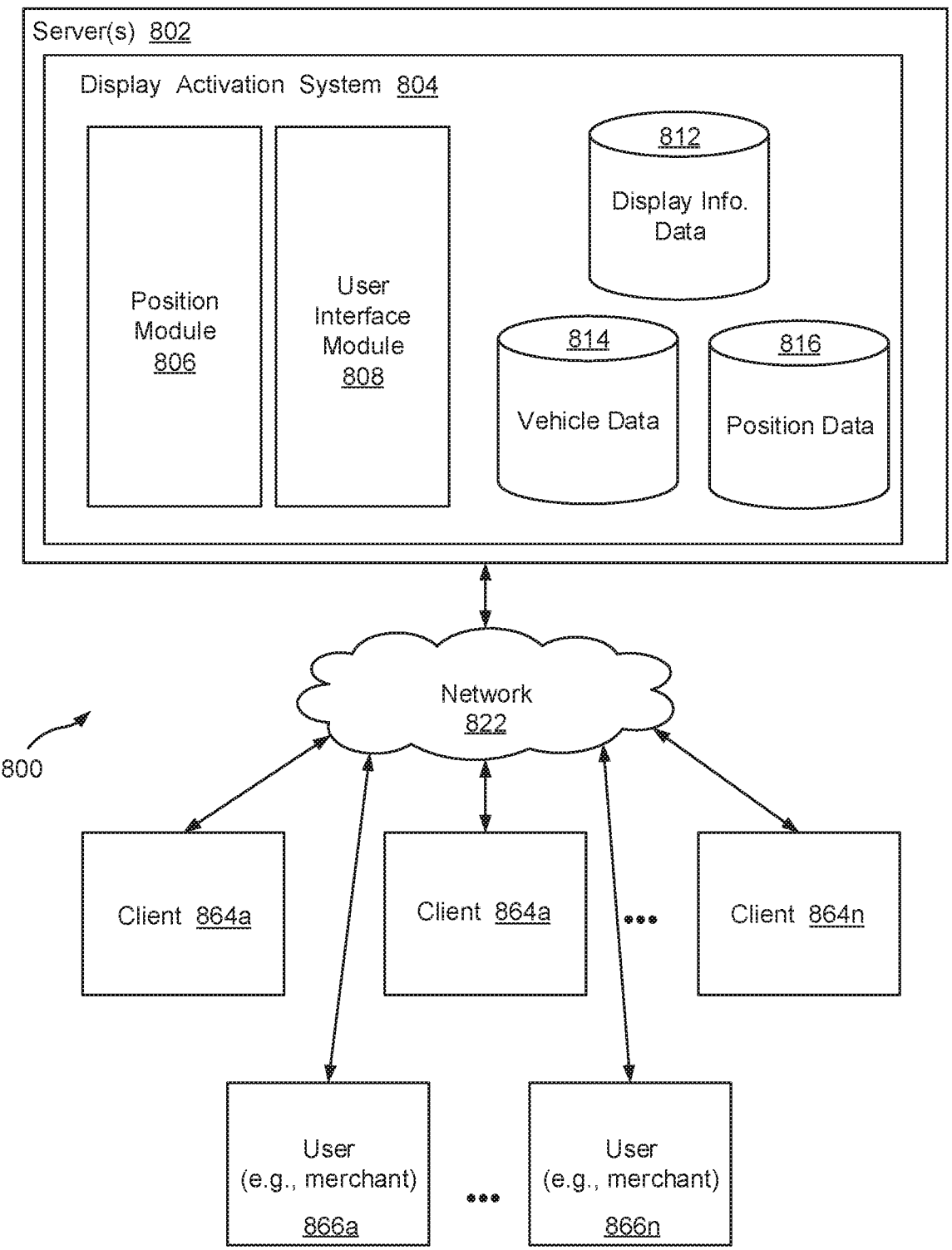
FIG. 8 is a block diagram that illustrates various example components included in a vehicle information display system, in accordance with an embodiment of the present technology.

FIG. 8 illustrates components of an example system 800 on which the present technology may be executed. The system 800 may include one or more servers 802 that may contain modules and data stores that comprise a display activation system 804. In one example, a server 802 may be located in a service provider environment (e.g., a "cloud" environment) and the server 802 may host the display activation system 804 within the service provider environment, such that the display activation system 804 may be available to clients 864a-n and users 866a-n via a network 822.

A client 864a-n may include any device capable of sending and receiving data over a network 822 (such as a mobile device of a driver of a vehicle V1, as in FIG. 7). A client 864a-n may comprise, for example, a processor-based system such as a computing device. A client 864a-n may be a device such as, but not limited to, a desktop computer, laptop or notebook computer, tablet computer, handheld computer, workstation, network computer, or other devices with like capability. The server 802 may be in communication with the clients 864a-n via a network 822. A client 864a-n may be a device associated with a vehicle (e.g., V1) and/or a driver/passenger of the vehicle. Alternatively, a client 864a-n may by a display device itself, and that is capable of transmitting and receiving signals, and that has a positioning device thereon (e.g., GPS receiver, Bluetooth, Wi-Fi, etc.)

In one example, a server 802 may include a user interface module 808 and a position module 606. The user interface module 808 may be configured to display activation output to clients 864a-n that receives display activation input from the clients 864a-n. For example, display activation output may include graphics data for associated with display information (e.g., advertising information) for display on a particular electronic information display device (e.g., D1 of FIG. 7). In one example, the user interface module 808 may be used to provide a description and location to one or more users 886a-n regarding one or more clients 864a-n (e.g., drivers of vehicles having mobile devices) that may be within or near a display activation zone associated with a location of the user 886*a-n*. Based on such information, the user 886*a-n* can select which client(s) 864*a-n* should display information associated with the user 886*a-n* when the client 864*a-n* is within the respective display activation zone associated with the user 886*a-n*.

The position module 606 may be configured to determine the position of one or more clients 864*a-n* using vehicle data 814 and position data 816. Specifically, the position module 806 may be configured to identify, using the position data 816, a display activation zone, based on user data 818, which includes the position of a vehicle, where the display activation zone is defined by the determined physical location of the user 866*a-n*. The position module 806 may be configured to then identify display information, using display information data 812, associated with the user 866*a-n*. For instance, if the user is a popular restaurant chain, the position module 806 can identify the particular advertising data, using display information data 812, associated with that particular user. Based on the identified display information, the server 802 can be configured to send instructions to a device associated with the client 864*a-n*, via the network 822, to display the display information on the electronic information display device supported by the vehicle associated with the client 864*a-n*.

In addition, the position module 806 may be configured to compare the position data 816 of the vehicle with a geographic boundary, using user location data of user data 818, defined by the display activation zone. In one example, the user 866*a-n*, using the user interface module 808, can select the geographic boundary, the location, the type of information to display, the duration to display, the times/dates to display and so forth.

It should be appreciated that the position module 806 can perform the above operations for any number of clients and users concurrently and/or sequentially. As noted above, the position module 806 can determine an order of display information to be displayed based on the number of users 866*a-n*, and then cause to be transmitted via the network 822, to one or more clients 864*a-n*, data associated with the particular order, time, date, etc. of the particular display information to be displayed. In one example, the position module 806 may be configured to send instructions to the one or more clients 864*a-n* to cause sequential display of a number of different display information on the associated electronic information display device while the vehicle is within respective display activation zones of the users 866*a-n*. For instance, a particular electronic information display device may be caused to sequentially display different information (e.g., different/competing advertisements) associated with different users/merchants while the vehicle is within the respective display activation zones of the users, and such sequential display may be cause to occur in a loop.

The position module 806 may also be useful in applications involving law enforcement and/or emergency responders. For instance, the position module 806 can be configured to determine whether a number of clients 864*a-n* (e.g., law enforcement vehicles, ambulances, first responders, etc.) have traveled or are within a particular display activation zone, such as within a 10 mile radius of a particular geolocation, which may be dictated by coordinates entered by a user or command center, or by the location of a particular user 866*a-n* that may be always within the geo-location (e.g., a Red Cross center). Then, the position module 806 may be configured to cause the same display information (e.g., location of food/water, supplies, etc.) among all of the electronic information display devices associated with the vehicles associated with the clients 864*a-n* that may be within the display activation zone. And, the position module 806 may be configured to periodically update the display information to provide updated/current information that may be critical to the population.

The various processes and/or other functionality contained within the system 800 may be executed on one or more processors that are in communication with one or more memory modules. The system 800 may include a number of computing devices that are arranged, for example, in one or more server banks or computer banks or other arrangements.

The system 800 may include data stores for storing display information data 812, vehicle data 814, position data 616, and user data 818. Display information data 812 may include data obtained from users 866*a-n* that may include data for displaying graphical information, textual information, animations, and any other data that the user may select to be displayed on one or more electronic information display devices. The vehicle data 814 may include data obtained from the clients 864*a-n*, such as the type of vehicle, name of the client/driver, the size and type of electronic information display device supported by the vehicle, and other information associated with the client and/or the vehicle and/or the electronic information display device. The position data 816 may include data obtained from one or more positioning systems, such as GPS satellites, Bluetooth, Wi-Fi, RFID tag systems, and other positioning systems that may be used to locate a dynamic and/or static position of one or more clients 864*a-n* (e.g., via a mobile device of the client), and/or a static position of one or more users 866*a-n* (e.g., via a mobile device of the user, or an input or known location of a structure, or IP address, etc.).

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The system 800 may use API calls, procedure calls, or other network commands that may be made in relation to the modules and services included in the system 800, and communications between the clients 864*a-n* and the display activation system 804. API calls may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 822 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

Figure 9:
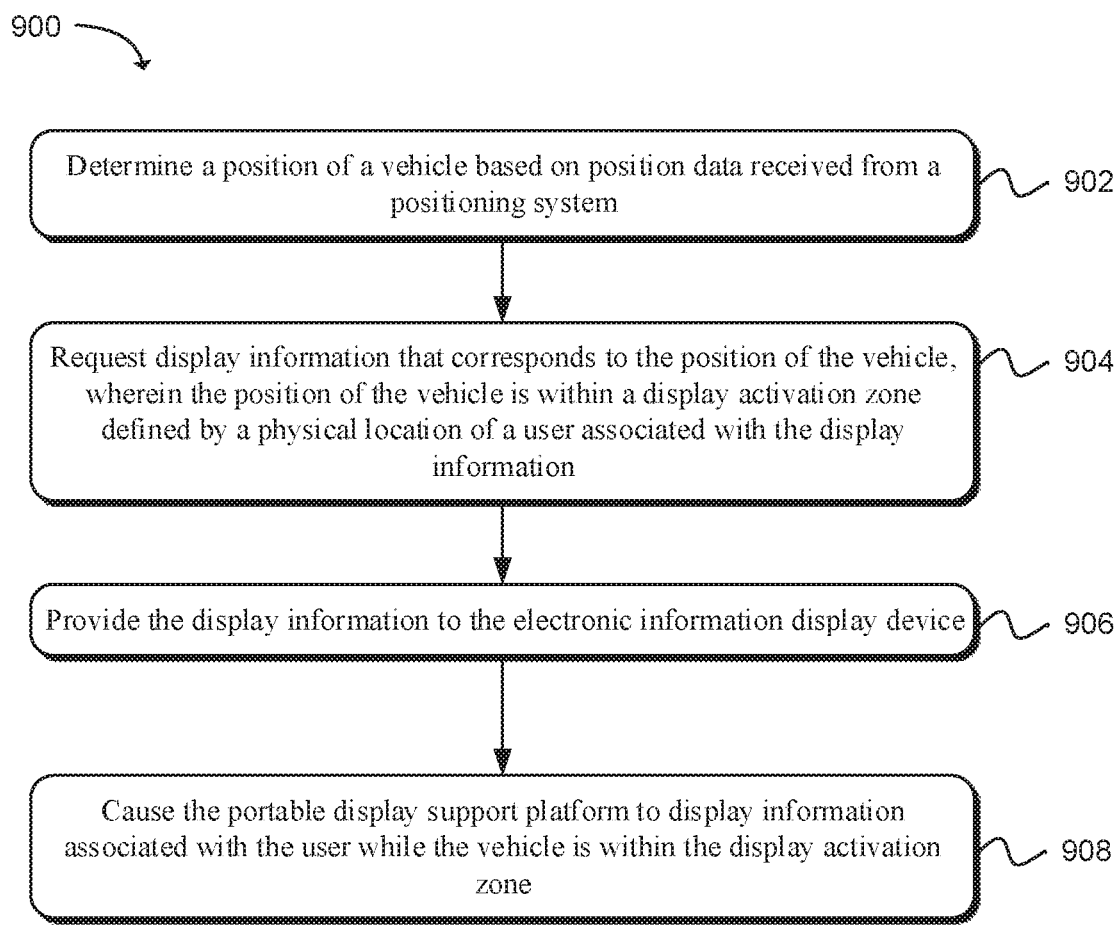
FIG. 9 is a flow diagram that illustrates an example method for a display activation system based on location, in accordance with an embodiment of the present technology.

FIG. 9 is a flow diagram that illustrates an example method 900 for a display activation system to cause display of information on an electronic display information device supported by a vehicle based on position, which can be executed or implemented by a computer system. As in block 902, the method can include determining a position of the vehicle based on position data received from a positioning system. As in block 904, the method can include requesting display information that corresponds to the position of the vehicle, and when or if the position of the vehicle is within a display activation zone defined by a physical location of a user associated with the display information. As in block 906, the method can include providing the display information to the electronic information display device. As in block 904, the method can include causing the portable display support platform to display information associated with the user while the vehicle is within the display activation zone.

Figure 10:
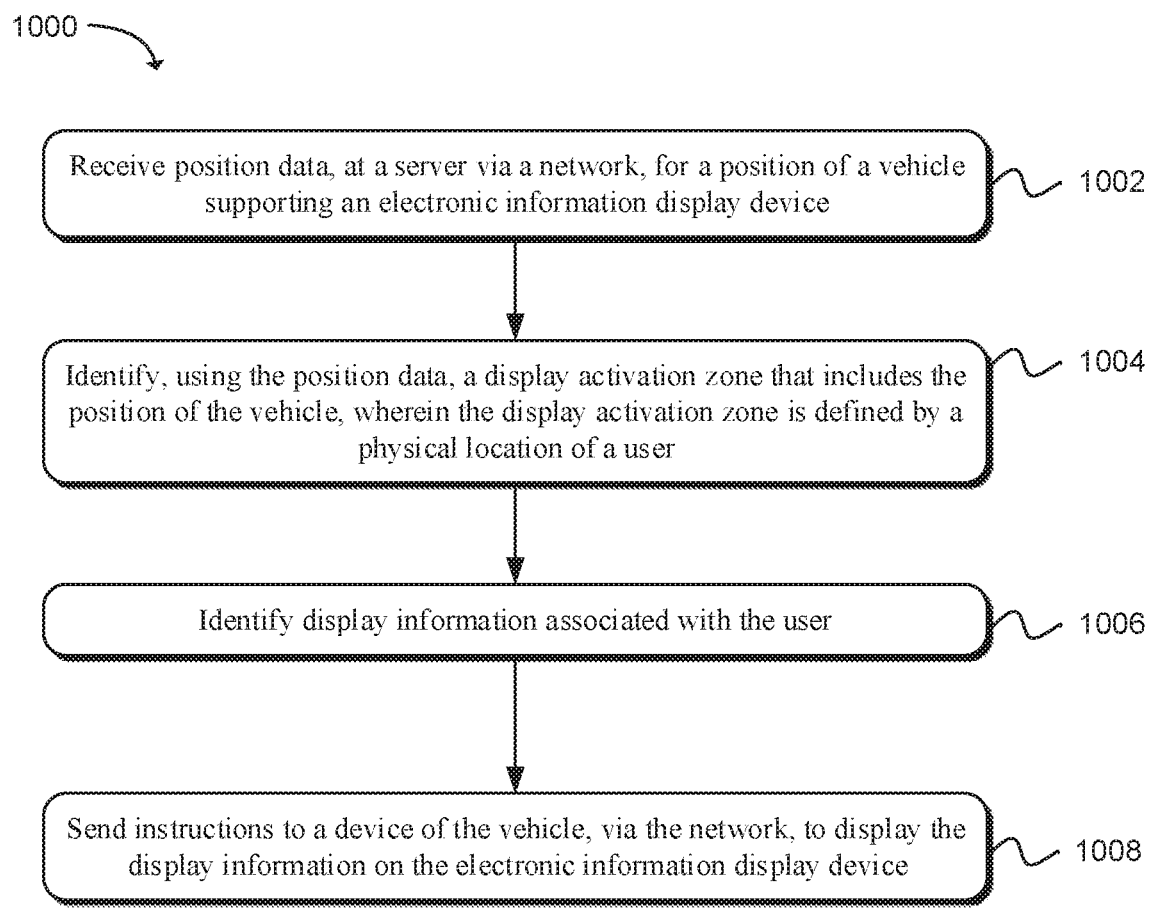
FIG. 10 is a flow diagram that illustrates an example method for a display activation based on location, in accordance with an embodiment of the present technology.

FIG. 10 is a flow diagram that illustrates an example method 1000 for a display activation system to cause display of information on an electronic display information device supported by a vehicle based on position, and that can be executed or implemented by a computer system. As in block 1002, the method can include receiving position data, at a server via a network, for a position of a vehicle supporting an electronic information display device. As in block 1004, the method can include identifying, using the position data, a display activation zone that includes the position of the vehicle, and where the display activation zone is defined by a physical location of a user. As in block 1004, the method can include identifying display information associated with the user. As in block 1008, the method can include sending instructions to a device of the vehicle, via the network, to display the display information on the electronic information display device.

Figure 11:
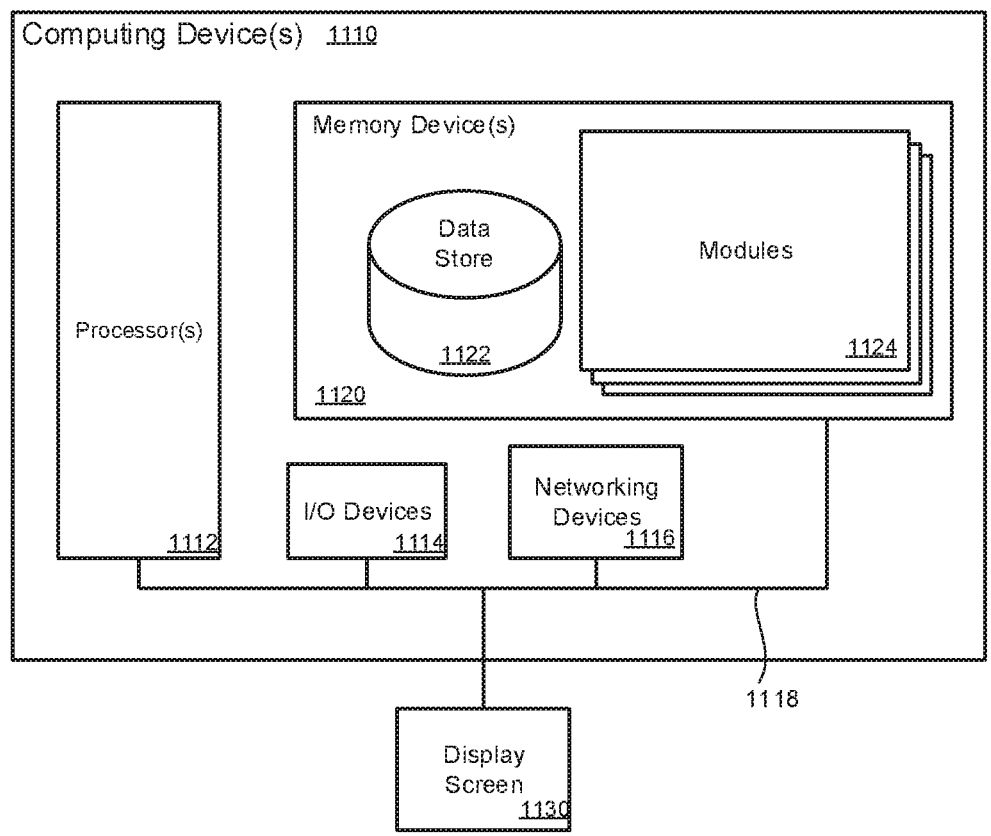
FIG. 11 is block diagram illustrating an example of a computing device that may be used to execute a system, in accordance with an embodiment of the present technology.

FIG. 11 illustrates a computing device 1110 on which modules of this technology may execute. A computing device 1110 is illustrated on which a high level example of the technology may be executed. The computing device 1110 may include one or more processors 1112 that are in communication with memory devices 1120. The computing device 1110 may include a local communication interface 1118 for the components in the computing device. For example, the local communication interface 1118 may be a local data bus and/or any related address or control busses as may be desired.

The memory device 1120 may contain modules 1124 that are executable by the processor(s) 1112 and data for the modules 1124. For example, the memory device 1120 may include a display activation module, a user interface module, and other modules. The modules 1124 may execute the functions described earlier. A data store 1122 may also be located in the memory device 1120 for storing data related to the modules 1124 and other applications along with an operating system that is executable by the processor(s) 1112.

Other applications may also be stored in the memory device 1120 and may be executable by the processor(s) 1112. Components or modules discussed in this description that may be implemented in the form of software using high-level programming languages that are compiled, interpreted or executed using a hybrid of the methods.

The computing device may also have access to I/O (input/output) devices 1114 that are usable by the computing devices. An example of an I/O device is a display screen 1130 that is available to display output from the computing device 810. Networking devices 1116 and similar communication devices may be included in the computing device. The networking devices 1116 may be wired or wireless networking devices that connect to the internet, a LAN, WAN, or other computing network.

The components or modules that are shown as being stored in the memory device 1120 may be executed by the processor(s) 1112. The term "executable" may mean a program file that is in a form that may be executed by a processor 1112. For example, a program in a higher level language may be compiled into machine code in a format that may be loaded into a random access portion of the memory device 1120 and executed by the processor 1112, or source code may be loaded by another executable program and interpreted to generate instructions in a random access portion of the memory to be executed by a processor. The executable program may be stored in any portion or component of the memory device 1120. For example, the memory device 1120 may be random access memory (RAM), read only memory (ROM), flash memory, a solid state drive, memory card, a hard drive, optical disk, floppy disk, magnetic tape, or any other memory components.

The processor 1112 may represent multiple processors and the memory device 1120 may represent multiple memory units that operate in parallel to the processing circuits. This may provide parallel processing channels for the processes and data in the system. The local interface 1118 may be used as a network to facilitate communication between any of the multiple processors and multiple memories. The local interface 1118 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference has been made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. An information display system for use on a vehicle, comprising:
  a portable display support platform;
  at least one vehicle interface support member coupled to the portable display support platform, the at least one vehicle interface support member comprising a universal vehicle coupling device operable to couple the portable display support platform to a vehicle support structure;
  an electronic information display device supported by the portable display support platform, and moveable between a stowed position and a deployed position, wherein the electronic information display device is operable to display information when in the deployed position; and
  a mobile electronics device associated with a user of the vehicle, the mobile electronics device comprising a GPS system for determining a position of the vehicle, and
  comprising a wireless communication module communicatively coupled to a wireless communications device of the electronic information display device, whereby the mobile electronics device is operable to control movement of the electronic information display device and to control a type of display information to display on the electronic information display device; wherein
  a display activation zone is identified by the mobile electronics device by comparing the position of the vehicle with a geographic boundary; and
  the display information is associated with a plurality of users, and the mobile electronics device is configured to send instructions to the electronic information display device to sequentially display the display information on the electronic information display device while the vehicle is within respective display activation zones of the plurality of users.

2. The vehicle information display system of claim 1, wherein the at least one vehicle interface support member comprises a plurality of vehicle interface support members, each comprising a universal vehicle coupling device to couple the portable display support platform to the vehicle support structure.

3. The vehicle information display system of claim 2, wherein each of the plurality of vehicle interface support members are translatably coupled to the portable display support platform.

4. The vehicle information display system of claim 2, further comprising a compliant device operable to bias respective vehicle interface support members away from or towards the portable display support platform for biasingly coupling to the vehicle support structure.

5. The vehicle information display system of claim 2, wherein at least some of the plurality of vehicle interface support members extend in opposite directions from each other.

6. The vehicle information display system of claim 1, wherein the universal vehicle coupling device comprises a clamp operable to clamp the vehicle information display system to different sizes of vehicle support structures.

7. The vehicle information display system of claim 1, further comprising a display deployment mechanism comprising a hinge pivotally coupling the electronic information display device to the portable display support platform.

8. The vehicle information display system of claim 7, wherein the display deployment mechanism further comprises a motor operable to move the electronic information display device between stowed and deployed positions.

9. The vehicle information display system of claim 1, wherein the type of display information to display on the electronic information display device is associated with a determined physical location of a user.

10. A display activation system based on location, comprising:
- a vehicle supporting an electronic information display device;
- a computing device with at least one processor and at least one memory including instructions that, when executed by the at least one processor, cause the computing device to:
- determine a position of the vehicle based on position data received from a positioning system, wherein a mobile electronics device is associated with a user of the vehicle, the mobile electronics device comprising a GPS system for determining the position of the vehicle, and the mobile electronics device comprises a wireless communication module communicatively coupled to a wireless communications device of the electronic information display device, whereby the mobile electronics device is operable to control movement of the electronic information display device and to control a type of display information to display on the electronic information display device;
- request display information that corresponds to the position of the vehicle, wherein the position of the vehicle is within a display activation zone defined by a physical location of a plurality of users associated with the display information, wherein the display activation zone is identified by comparing the position data of the vehicle with a geographic boundary;
- provide the display information for the plurality of users sequentially to the electronic information display device while the vehicle is within respective display activation zones of the plurality of users; and
- cause the electronic information display device to display information associated with the user while the vehicle is within the display activation zone.

11. The vehicle information display system of claim 10, wherein the instructions cause the computing device to cause the electronic information display device to modify the display information based on a dynamic position of the vehicle.

12. The vehicle information display system of claim 10, wherein the instructions cause the computing device to cause the electronic information display device to remove the display information while the vehicle is outside of the display activation zone.

13. The vehicle information display system of claim 10, further comprising a portable display support platform supporting the electronic information display and further comprising at least one vehicle interface support member coupled to the portable display support platform and coupled to a vehicle support structure of the vehicle, and further comprising a hinge pivotally coupling the electronic information display device to the portable display support platform to facilitate movement of the electronic information display device between stowed and deployed positions.

14. A computer implemented method, comprising:
- receiving position data, at a server via a network, for a position of a vehicle supporting an electronic information display device, wherein a mobile electronics device is associated with a user of the vehicle, the mobile electronics device comprising a GPS system for determining the position of the vehicle, and the mobile electronics device comprises a wireless communication module communicatively coupled to a wireless communications device of the electronic information display device, whereby the mobile electronics device is operable to control movement of the electronic information display device and to control a type of display information to display on the electronic information display device;
- identifying, using the position data, a display activation zone that includes the position of the vehicle, wherein the display activation zone is defined by a physical location of a plurality of users;
- identifying display information associated with the plurality of users, wherein identifying the display, activation zone further comprises comparing the position data of the vehicle with a geographic boundary; and
- sending instructions to a device of the vehicle, via the network, to sequentially display the display information associated with the plurality of users on the electronic information display device while the vehicle is within respective display activation zones of the plurality of users.

15. The computer implemented method of claim 14, further comprising:
- receiving position data for positions of a plurality of vehicles supporting an electronic information display device;
- identifying, using the position data, a plurality of display activation zones that include the positions of the vehicles, wherein the display activation zones are defined by respective physical locations of a plurality of users;
- identifying display information associated with respective users; and
- sending instructions to a device of each vehicle, via the network, to display the display information on the electronic information display device of the respective vehicles.

* * * * *